Aug. 18, 1959  C. H. DE BERRY ET AL  2,899,887
APPARATUS FOR BREWING COFFEE
Filed Nov. 8, 1954  2 Sheets-Sheet 2

INVENTORS
CHARLES H. DE BERRY
ALBERT J. GUIDI
BY Ralph L. Freeland, Jr.
ATTORNEY United States Patent Office 2,899,887
Patented Aug. 18, 1959

2,899,887
APPARATUS FOR BREWING COFFEE

Charles H. De Berry, Redwood City, and Albert J. Guidi, San Bruno, Calif.; Marcella De Berry, administratrix of said Charles H. De Berry, deceased, assignors to De Berry, Guidi and Andreadis, doing business as Skyline Products, New York, N.Y., a partnership Application November 8, 1954, Serial No. 467,509

2 Claims. (Cl. 99—310)

The present invention relates to an improved method of and apparatus for brewing coffee, more particularly to an improved system for brewing percolator-type coffee, and has for an object the provision of a method of controlling the flow of water through ground coffee, after the water has risen through a percolator fountain tube, to obtain a more efficient extraction of the coffee taste from the ground coffee beans.

While the percolator method of brewing coffee has long been recognized as one of the most widely used and preferred systems for extracting flavor and essence of coffee from the ground beans, it has been known that this method requires either a prolonged brewing period or a surplusage of coffee to produce a full-flavored cup of coffee. If the period of brewing is prolonged the bitter oils within the coffee particles are extracted and become incorporated in the brew. On the other hand, it is desirable economically to use as little coffee as possible in brewing.

We have found it possible by the present invention to brew a full-bodied coffee by the percolator system employing no more ground coffee than required by more complex systems, such as the "Silex," or glass coffee-maker method. In accordance with our invention, the flow of water and steam rising through the fountain tube of a conventional percolator coffee pot is caused to flow downwardly and inwardly into the center of the brewing zone which contains the ground coffee particles. The direction of flow of the water is so controlled that it will flow downwardly into the center of the brewing zone and then radially outward with simultaneous upward rise of the coffee enriched water from the brewing zone, causing spill-over from the top of the brewing zone to return coffee liquor to the pot.

In accordance with a preferred form of apparatus for performing the above-described method, the water-steam flow from the top of a fountain tube in a percolator is received by a conically formed reservoir member supported adjacent the top of the fountain tube, which acts as a funnel as well as a reservoir. The bottom of the funnel-reservoir member is placed in direct communication with a cup-like coffee basket which forms the brewing zone through a cover plate member. As particularly distinguished from previously known percolator systems, said basket forming the brewing zone is constructed not only with a closed bottom but also with the side walls thereof closed. By virtue of said construction, flow of the enriched coffee liquor after contact with the coffee particles in the basket is controlled by a plurality of ports formed in the outer edge of a cover plate and a substantially annular opening formed by the side walls of said basket and the circumference of said cover plate. Further, in accordance with the preferred form of our invention the cover plate and basket are secured together in a fixed relationship by lock means between the fountain tube and said cover plate to assure that the flow of coffee liquor is radially outward and upward from the center of said basket.

Other objects and advantages of the present invention will become apparent from the following detailed description, taken in conjunction with the accompanying drawings, which form an integral part of the present specification.

Figure 1:
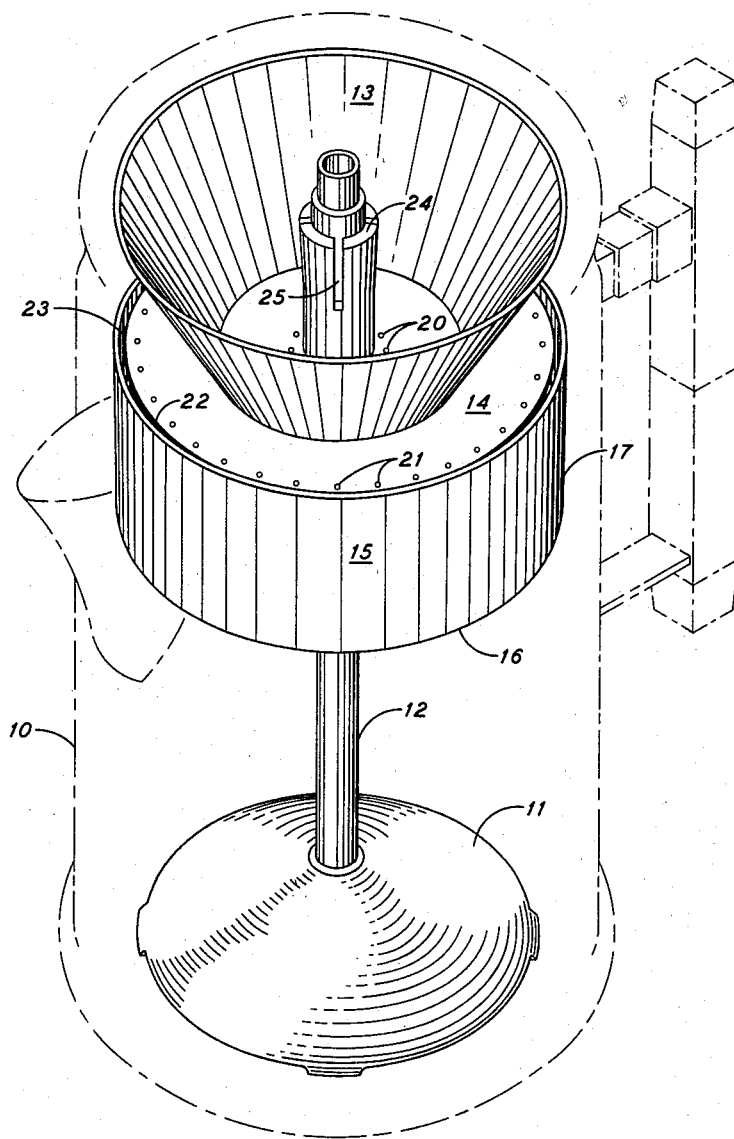
Fig. 1 is perspective view of a preferred embodiment of a coffee brewer constructed in accordance with the present invention.

Referring now to the drawings, it will be observed that our improved coffee brewing method is adapted to be incorporated in a conventional coffee percolator 10 using any desired type of closed pot wherein water may be boiled. The boiling water within the vapor-trap, such as the dome-shaped base 11, is caused to rise to the top of a fountain tube 12 by the vapor or steam generated within vapor trap 11. Thus, in a manner well understood, boiling water is raised to the top of fountain tube 12.

From the top of tube 12, the water is brought into contact with the comminuted coffee beans in a brewing zone formed by a side and bottom closed bowl 15 supported midway between the ends of tube 12 by collar 26 on tube 12 and stem engaging sleeve 18, formed as an integral part of bowl, or cup 15. As particularly distinguished from previously known methods of brewing coffee, our invention provides a system for controlling the direction of water flow into and through the coffee particles. In part this control is provided by the substantially closed side walls 17 and closed bottom 16 of bowl 15 and in part by the flow directing means, including funnel reservoir member 13 and cover member 14, which, as shown in the preferred embodiment of Fig. 2, may be formed unitarily.

Figure 3:
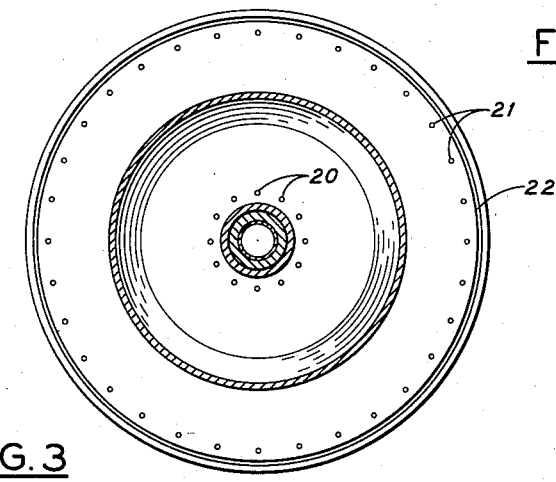
Fig. 3 is a plan view, partially in section taken in the direction of arrows 3—3 in Fig. 2.

In directing flow of water into the substantially closed brewing zone, it will be observed that reservoir member 13 is provided with a funnel-like configuration so that all of the fluid will be directed into the central portion of the brewing zone and then admitted to that zone by holes 20 formed in cover member 14. As shown, holes 20 are positioned closely around the portion of plate 14 through which tube 12 passes to cause water to flow from the center radially outward through the bulk of the coffee particles in bowl 15. Further controlling the direction of water flow during the brewing operation, the circumference of cover 14 is desirably formed to provide an annular opening a few thousandths of an inch wide with the inner surface of closed side wall 17, so that coffee-enriched liquor may rise to overflow from bowl 15. Additionally, the outer edge of cover 14 is provided with a circle of holes 21 (best seen in Fig. 3) through which the enriched liquor may also rise after radially traversing the coffee particles.

Figure 2:
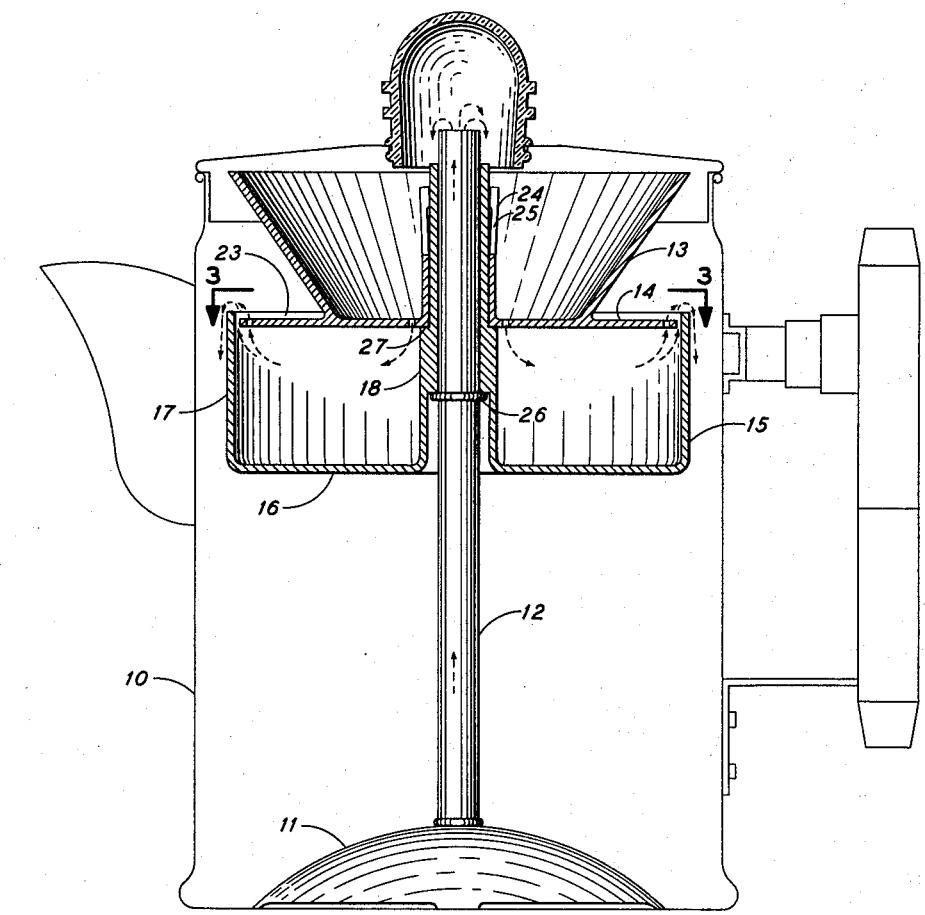
Fig. 2 is a sectional elevation view of the coffee brewer of Fig. 1 incorporated in a percolator.

For the purpose of maintaining cover 14 on its seat 27 and in its assembled relationship with bowl 15, after the coffee particles are wetted and swell within the brewing zone, the cover and reservoir assembly is provided with a plurality of spring-like fingers 24, formed by slots 25 which engage sleeve 18 in the manner shown in Figs. 1 and 2. Fingers 24 are biased to effectively clamp cover 14 to bowl 15 with the upper surface of cover 14 slightly below the upper end of closed outer wall 17. This arrangement of the top of cover 14 with respect to upper edge of wall 17 provides a header portion, identified as 23, which assures the full coverage of the coffee particles by liquid, since the coffee enriched liquid must overflow from header 23 to return to pot 10.

By the foregoing assembly of bowl 15, cover member 14 and reservoir 13, there is provided an improved method of brewing coffee by the percolator system which more fully extracts the coffee essence from the ground bean particles. By the preferred construction of reservoir-funnel member 13, water is brought to its ideal brewing temperature of about 204° F. by providing a reservoir wherein the boiled water may be collected and cooled. Additionally, said reservoir is positioned relative to the brewing zone, bowl 15, so that it will maintain a pressure head on the water in said bowl after the resistance to flow therethrough has increased due to swelling of the coffee bean particles. By providing the funnel-like construction and the openings 20 in plate 14, at bottom of reservoir 13, this fluid pressure head is made self-regulating in response to variations in the resistance to flow through the brewing zone during the brewing or "perking" period due to variations in both the amount and size of coffee particles in bowl 15. It will be seen that by the present system, the coffee particles are at all times submerged to insure full contact between coffee and water at the proper brewing temperature with continuous flow being forced therethrough by the only outlets from bowl 15 being formed around the periphery of cover 14.

A further advantage of the preferred construction over previously known percolator systems lies in the fact that the coffee brewing bowl 15 may be drained without loss of liquid or introduction of grounds into the drink while still in the coffee pot. Alternatively, the bowl and fountain tube units may be bodily lifted from the pot and placed on any convenient work table or sink drainboard without spillage of coffee liquor or grounds thereon.

Various modifications and changes in both the method and the preferred form of apparatus can be made without departure from the present invention. The method of supporting the fountain tube and the brewing zone in the pot will, of course, vary with the type and style of coffee pot and the arrangement for collecting vapor and water at the lower end of tube 12. Likewise, the locking means for securing cover 14 relative to bowl 15 and both with respect to the upper end of tube 12 may be varied from the form shown and described.

All such modifications and changes falling within the scope of the appended claims are intended to be included therein.

We claim:

1. In a coffee percolator of the type wherein water is recirculated through a coffee brewing bowl and includes a pot having a generally cylindrical body with a pouring spout near the top of said body and communicating with the interior of said body, a vapor collector adjacent the bottom of said body, a fountain tube in communication with said vapor collector and extending thereabove to near the top of said body, a coffee brewing bowl positioned on and intermediate the ends of said fountain tube and radially spaced from the sides of said body, said brewing bowl having closed sides and bottom for confining comminuted coffee particles therein while preventwater flow therethrough, reservoir means above said brewing bowl and below the top of said fountain tube, cover means for the top of said bowl intermediate said reservoir and bowl top, said cover means having fluid passageway means therethrough for admitting fluid from said reservoir to said bowl only around said fountain tube, additional fluid passageway means formed adjacent the sides of said bowl for permitting outward flow from said bowl to cause substantially all of the enriched coffee liquor resulting from contact between heated water and coffee particles in said bowl to rise above said particles when flowing out of said bowl for continuous percolation and recirculation of water from the bottom of said cylindrical body through said fountain tube to said reservoir, thence down into said brewing bowl along said fountain tube and radially outward and upward in said brewing bowl for overflow through the radial space between said bowl and said body into the cylindrical body.

2. In a coffee percolator of the type wherein a coffe basket is supported in spaced relation to the sides of a decanter that includes a vertically elongated body having a pouring spout near its upper end that communicates with the inside of said body, and a vapor generator near the bottom of said body, a fountain tube and means for supporting said tube above said vapor generator centrally through said body from near the bottom to near the top of said body, a coffee basket removably supported by said tube intermediate its ends, said coffee basket having imperforate side walls and bottom to prevent fluid flow therethrough, a cover slidably supported on said fountain tube to form a closure for the top of said basket, said cover and said basket side walls being spaced apart sufficient to form a restricted fluid passageway for fluid rising in said closed basket, a funnel shaped reservoir supported on said foutain tube above said cover, the top of the outwardly and upwardly flared portion of said funnel being below the top of said tube, said funnel converging toward said cover and said tube, ports communicating between the bottom of said funnel and said cover, said ports being formed only immediately around said tube, whereby water rising from said vapor generator through said fountain tube is collected in said reservoir for circulation through said basket from near said fountain tube radially outward through coffee particles in said basket and then rises through the restricted passageway between said cover and said basket to spill over the sides of said basket and return to said decanter through the space between said basket and the sides of said decanter for continuous recirculation.

References Cited in the file of this patent

UNITED STATES PATENTS

| | | |
|---|---|---|
| 1,077,491 | Savage | Nov. 4, 1913 |
| 1,130,131 | Anderson | Mar. 2, 1915 |
| 1,276,774 | Kuhn et al. | Aug. 27, 1918 |
| 1,331,530 | Shaw | Feb. 24, 1920 |
| 1,916,369 | Harpster | July 4, 1933 |
| 1,922,782 | Schallis | Aug. 15, 1933 |
| 1,971,490 | Keith | Aug. 28, 1934 |
| 2,122,046 | Rosenheimer | June 28, 1938 |
| 2,232,614 | Kopf | Feb. 18, 1941 |
| 2,314,543 | Kopf | Mar. 23, 1943 |
| 2,660,107 | Cappello | Nov. 24, 1953 |

FOREIGN PATENTS

| | | |
|---|---|---|
| 922,013 | France | Jan. 20, 1947 |